(12) United States Patent
Burton

(10) Patent No.: US 9,709,235 B2
(45) Date of Patent: Jul. 18, 2017

(54) SYNCHRONIZED LAMP ADJUSTER

(71) Applicant: Burton Technologies, LLC, Ludington, MI (US)

(72) Inventor: John Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 176 days.

(21) Appl. No.: 14/587,334

(22) Filed: Dec. 31, 2014

(65) Prior Publication Data

US 2015/0117042 A1    Apr. 30, 2015

Related U.S. Application Data

(63) Continuation-in-part of application No. 13/945,667, filed on Jul. 18, 2013.

(60) Provisional application No. 61/674,211, filed on Jul. 20, 2012, provisional application No. 61/677,944, filed on Jul. 31, 2012.

(51) Int. Cl.
| | |
|---|---|
| *B60Q 1/068* | (2006.01) |
| *F21S 8/10* | (2006.01) |
| *F21W 101/02* | (2006.01) |
| *B60Q 1/072* | (2006.01) |

(52) U.S. Cl.
CPC ........ *F21S 48/1388* (2013.01); *B60Q 1/0683* (2013.01); *B60Q 1/072* (2013.01); *B60Q 2200/36* (2013.01); *F21W 2101/02* (2013.01)

(58) Field of Classification Search
CPC ...... F21S 48/10; F21S 48/1388; B60Q 1/124; B60Q 1/0683; B60Q 1/072; B60Q 2200/36; F21W 2101/02

USPC ....... 362/487, 233, 523, 287, 285, 289, 273, 362/428, 460, 421, 324, 524, 528, 514, 362/515, 512, 507

See application file for complete search history.

(56) References Cited

U.S. PATENT DOCUMENTS

| | | | | |
|---|---|---|---|---|
| 4,142,228 | A | * | 2/1979 | Kumagai ............... B60Q 1/068 362/420 |
| 4,722,030 | A | * | 1/1988 | Bowden ............... B60Q 1/2611 362/233 |
| 5,214,971 | A | | 6/1993 | Burton et al. |
| 5,416,456 | A | * | 5/1995 | Light ..................... H01H 36/00 335/205 |
| 5,416,465 | A | * | 5/1995 | Lin ........................ B60Q 1/121 340/465 |
| 5,481,441 | A | * | 1/1996 | Stevens .................... B60Q 1/24 362/232 |
| 5,697,691 | A | * | 12/1997 | Menke ................. B60Q 1/2611 362/286 |
| 5,707,133 | A | | 1/1998 | Burton |
| 6,257,747 | B1 | | 7/2001 | Burton |
| 6,773,153 | B2 | | 8/2004 | Burton |

(Continued)

*Primary Examiner* — Anh Mai
*Assistant Examiner* — Arman B Fallahkhair
(74) *Attorney, Agent, or Firm* — Brian G. Gilpin; Godfrey & Kahn, S.C.

(57) ABSTRACT

A synchronized lamp adjuster assembly allows for adjustment of vehicle lamp assemblies that can be adjusted synchronously or by using the same adjuster assembly. Two or more adjuster assemblies are connected together by at least one shaft drive assembly having a shaft drive head that interacts with an input shaft for the adjuster assemblies. Rotation of the shaft drive head causes rotation of input shaft and adjuster assembly thus causing adjustment of the lamp assemblies.

12 Claims, 15 Drawing Sheets

(56) References Cited

U.S. PATENT DOCUMENTS

| | | | |
|---|---|---|---|
| 6,779,912 B2* | 8/2004 | Krieg | B60Q 1/0683 362/460 |
| 7,004,607 B2 | 2/2006 | Aguinaga | |
| 7,052,164 B2 | 5/2006 | Burton | |
| 7,118,259 B2 | 10/2006 | Fladhammer | |
| 7,762,686 B2 | 7/2010 | Fladhammer | |
| 7,775,695 B1* | 8/2010 | Rose | B60Q 1/0483 362/269 |
| 7,824,087 B2 | 11/2010 | Gattone | |
| 9,120,422 B2* | 9/2015 | King | B60Q 1/0683 |
| 2011/0032716 A1 | 2/2011 | Burton | |
| 2014/0029278 A1 | 1/2014 | Burton | |

* cited by examiner

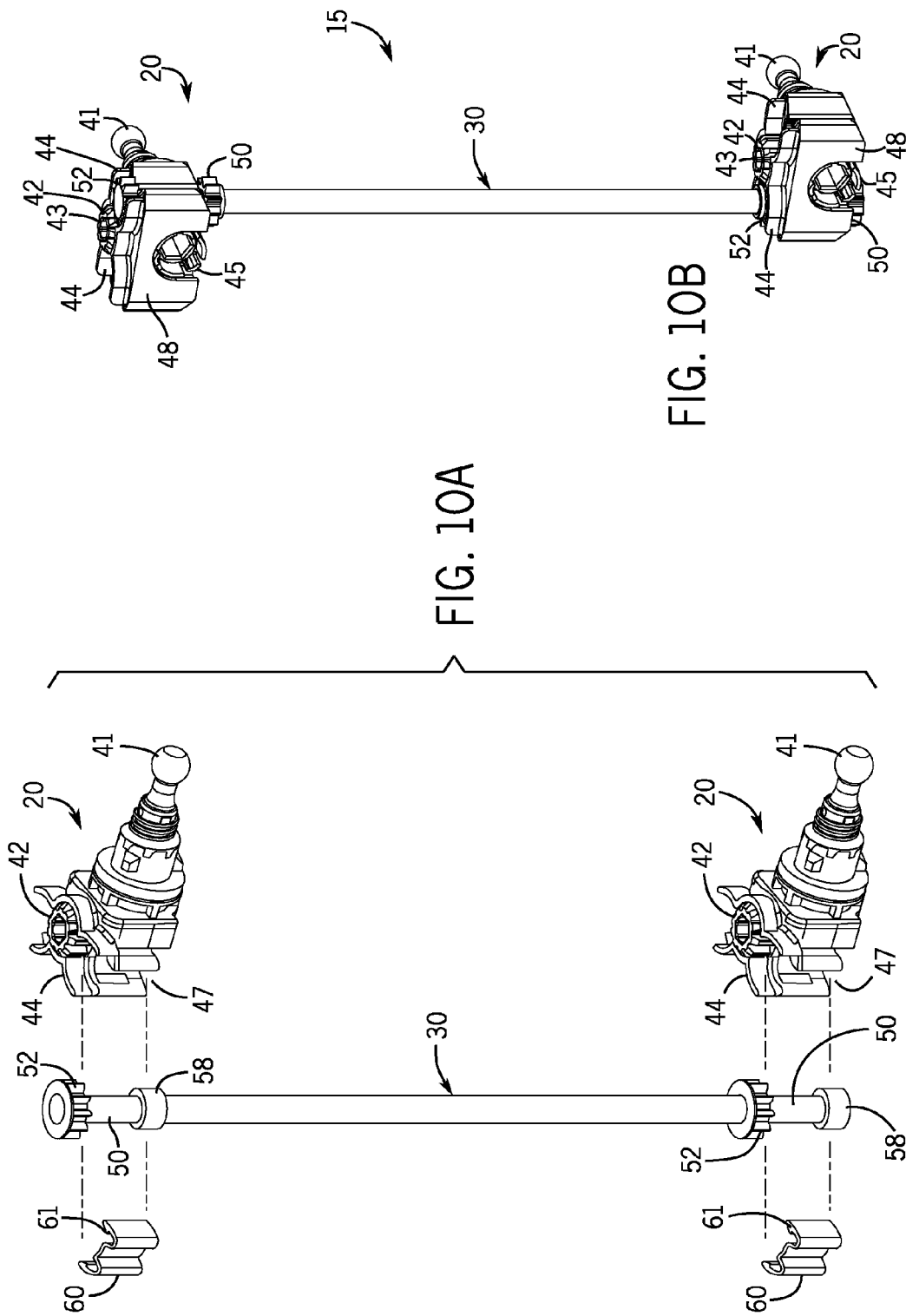

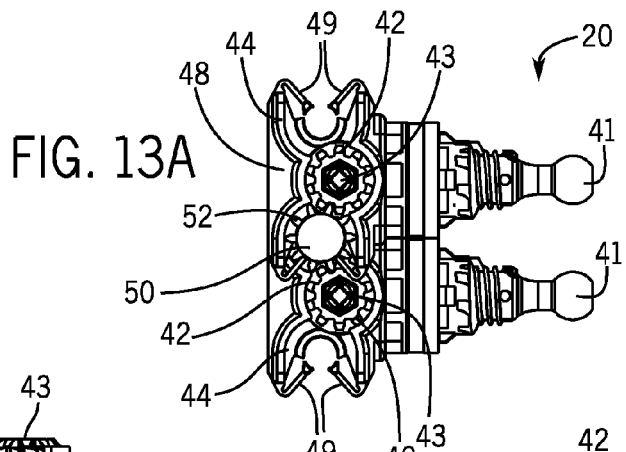
FIG. 13A
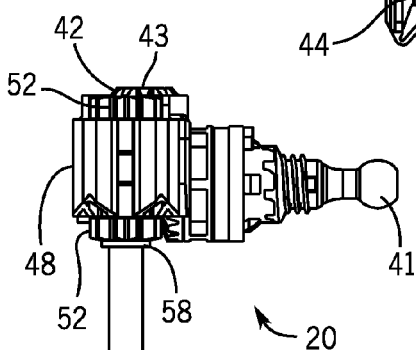
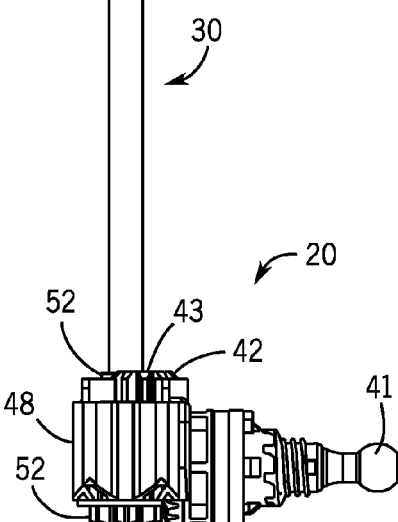
FIG. 13B
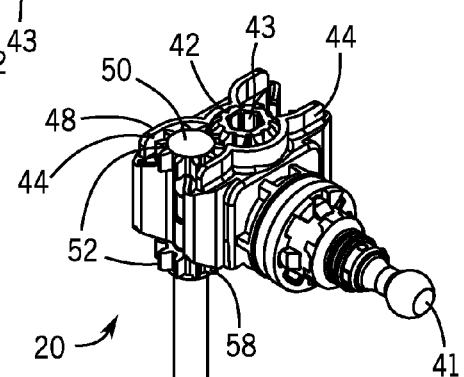
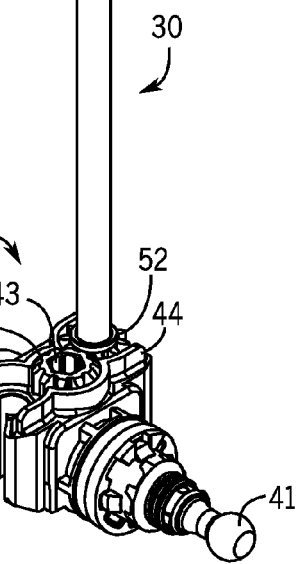
FIG. 13C

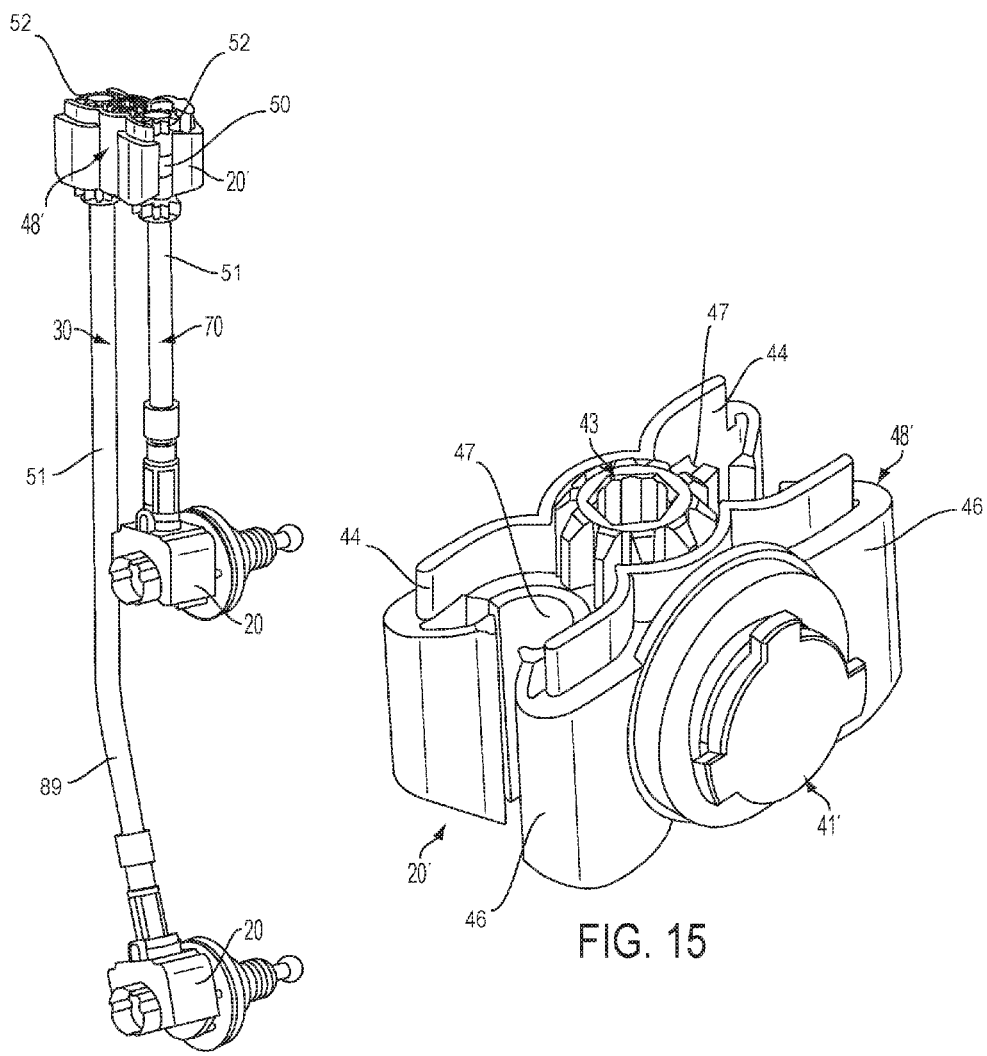

SYNCHRONIZED LAMP ADJUSTER

PRIORITY CLAIM/CROSS-REFERENCE TO RELATED APPLICATIONS

This application is a continuation-in-part of patent application Ser. No. 13/945,667, filed Jul. 18, 2013, which claims priority from U.S. Provisional Patent Application No. 61/674,211, filed Jul. 20, 2012, and from U.S. Provisional Patent Application No. 61/677,944, filed on Jul. 31, 2012, which are incorporated herein by reference for all purposes.

FIELD OF THE INVENTION

The present invention relates generally to the field of lamp adjusters for vehicles. More particularly, the present invention relates to adjusters for vehicle lamps that can be adjusted synchronously or by using the same adjuster assembly.

BACKGROUND

As the design of vehicles and automobiles has evolved over time, headlight designs have evolved as well. In particular, headlight designs have changed over time to improve the aerodynamic aspects of the front end of the vehicle. Modern headlights are often designed so that their lenses follow the contour of the vehicle to provide an aerodynamically efficient exterior surface. This has led to modular headlight designs requiring that the headlight adjustment mechanism to be located within the engine compartment of the vehicle so that headlight orientation and aim can be adjusted without removing any exterior trim pieces. Adjustment of aerodynamically designed headlights is more challenging than adjustment of traditionally designed headlights. However, adjustment of these headlights must still be performed in order to provide an optimal beam of light and to prevent the aiming of lights beams toward oncoming vehicles.

Automotive headlight assemblies typically comprise several basic parts: a support frame and one or more lamp assemblies, each comprising a reflector, a lens, a bulb or LED, and one or more adjusters. The support frame usually houses the reflectors and the bulbs on a pivotable mount to allow the aim of the light to be adjusted using the adjuster. The lens seals the front of the headlight assembly to protect it from the elements assailing the front end of the vehicle and provides an aerodynamic shape and attractive appearance. Traditionally, fixed and movable ball joints have engaged the headlamp reflector or lamp assembly. Actuating the moveable ball joint results in altering the angle of the lamp assembly by pivoting the reflector about the fixed ball joints. In certain variations, two movable ball joints are used to enable vertical and horizontal aiming of the headlamp. In some instances due to location constraints and restrictions on the access available behind the lamp, it would be desirable to adjust two moveable ball joints simultaneously or to otherwise have a single location where multiple adjustments can be implemented.

A wide variety of prior art adjuster devices are already known, including, among others, the devices disclosed in U.S. Pat. Nos. 5,214,971, 5,707,133, 6,773,153 and 7,052,164 to Burton, the inventor of the present invention, the disclosures of which are incorporated herein by reference. In some instances, an aiming screw or gear screw replaces the moveable ball joint. With an aiming screw or gear screw assembly, the lamp assembly is mounted inside the housing on a gear screw assembly and is adjustable horizontally and/or vertically using adjusters that interface with the lamp assembly by moving the gear screw. An example of a gear screw assembly is disclosed in U.S. Pat. No. 7,052,164. The adjusters disclosed in each of these prior art patents, however, must each be adjusted independently. For example, if a headlight assembly for a particular vehicle has two lamp assemblies, each headlight assembly may have two or more adjusters. Thus adjustment of the headlights of the vehicle thus requires positioning four separate adjuster assemblies.

There are several applications in which it would be desirable to have a headlamp adjuster apparatus that is capable of effectuating adjustment of multiple adjusters from a single location. For example, it would be desirable to provide a headlamp adjuster for use with aerodynamic headlight designs, in which the orientation and aim of the headlights is adjustable from inside the engine compartment. As another example, it would be desirable to provide a single headlamp adjuster for adjusting multiple lamp assemblies where the available space for adjusters is small. It would also be desirable to use ordinary tools to make any adjustments as well. FIGS. 1a-c illustrate three different examples of automobile headlights in which it would be useful to be able to position multiple adjusters from one location. FIG. 1a is an illustration of the headlight of a Honda NSX concept car having multiple lamp assemblies in a serial arrangement. FIG. 1b is an illustration of the headlight of a Ford Atlas concept car. FIG. 1c is an illustration of a headlight from a Cadillac Escalade.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

The present invention relates to adjusters for vehicle lamps that can be adjusted synchronously or by using the same adjuster assembly. A synchronized lamp adjuster assembly for a vehicle headlight includes two or more adjuster assemblies that are each capable of interacting with a lamp assembly in the vehicle headlight; and a shaft drive assembly having two shaft heads, each shaft head operably connected to an adjuster assembly such that when the shaft drive assembly is rotated, and each adjuster assembly moves simultaneously to change the position of the lamp assembly with which the adjuster assembly interacts.

A lamp adjuster assembly for adjusting more than one vehicle headlight from the same assembly includes a first adjuster assembly having a first input shaft operably connected to an adjustment gear, the first adjuster assembly capable of interacting with a first lamp assembly in the vehicle headlight; a second adjuster assembly having a second input shaft operably connected to an second adjustment gear, the second adjuster assembly capable of interacting with second lamp assembly in the vehicle headlight; and a shaft drive assembly having a first shaft head and a second shaft head, the first shaft head being coupled to the first adjuster assembly and the second shaft head being operably connected to the second adjuster assembly, such that the first lamp assembly can be adjusted by adjustment of the first input shaft and such that the second lamp assembly can be adjusted using the lamp adjuster assembly by adjusting the first shaft head of the shaft drive assembly.

A headlight assembly for an automobile includes at least two lamp assemblies, each lamp assembly including a reflector and a light source; a frame for supporting the at least two lamp assemblies; and a synchronized lamp adjuster assembly comprising two or more adjuster assemblies that are each capable of interacting with a lamp assembly; a shaft drive assembly having two shaft heads, each shaft head operably connected to an adjuster assembly such that when the shaft drive assembly is rotated, each adjuster assembly moves simultaneously to change the position of the lamp assembly with which the adjuster assembly interacts.

BRIEF DESCRIPTION OF THE DRAWINGS

FIGS. 10a and 10b illustrate the assembly of one embodiment of a synchronized lamp adjuster assembly. FIG. 10a shows the order of assembly; and FIG. 10b shows the assembled synchronized lamp adjuster assembly.

FIG. 11a is a top perspective view of the adjuster assembly; FIG. 11b is a front perspective view of the adjuster assembly; FIG. 11c is a side elevation view of the adjuster assembly; FIG. 11d is a front elevation view of the adjuster assembly.

FIG. 12a is a side elevation view of this embodiment of a synchronized lamp adjuster assembly.

FIGS. 13a-c are illustrations of another embodiment of a synchronized lamp adjuster assembly having two adjuster assemblies. FIG. 13a is a top plan view of the assembly in which the tops of the two adjuster assemblies are visible.

FIG. 13b is a side elevation view of the synchronized lamp adjuster assembly; FIG. 13c is a front perspective view of the synchronized lamp adjuster assembly.

FIG. 14 is a perspective view of an alternative embodiment of a synchronized lamp adjuster assembly.

FIG. 15 is top perspective view of the synchronized lamp adjuster head shown in FIG. 14.

DETAILED DESCRIPTION

Figure 1A:
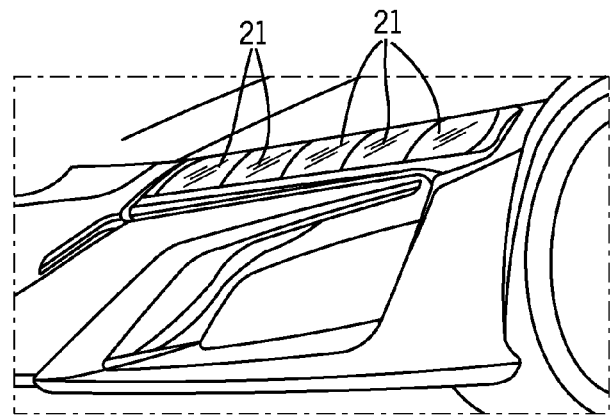
FIGS. 1a-c are examples of three different types of automotive headlamps in which a synchronized lamp adjuster may be particularly useful.

A synchronized lamp adjuster assembly 15 includes two or more adjuster assemblies 20 connected by at least one shaft drive assembly 30. (See FIG. 4). A synchronized lamp adjuster assembly, several embodiments of which are depicted in the figures, synchronously aims two or more lamp assemblies 21. This design is useful for adjusting the orientation and aim of lamp assemblies in headlights having two or more lamp assemblies that work together to provide the headlight of a vehicle. A synchronized lamp adjuster assembly is particularly useful for aerodynamically designed headlights and for those having multiple LED displays in serial organization. A variation of a synchronized lamp adjuster assembly is also useful for vehicles having particularly small space constraints as this device can be used to provide a single location for adjusting multiple lamp assemblies. As mentioned above, FIGS. 1a-1c illustrate a few examples of automobile headlights having multiple lamp assemblies 21 for which synchronous aiming via a synchronized lamp adjuster assembly is advantageous.

Figure 2:
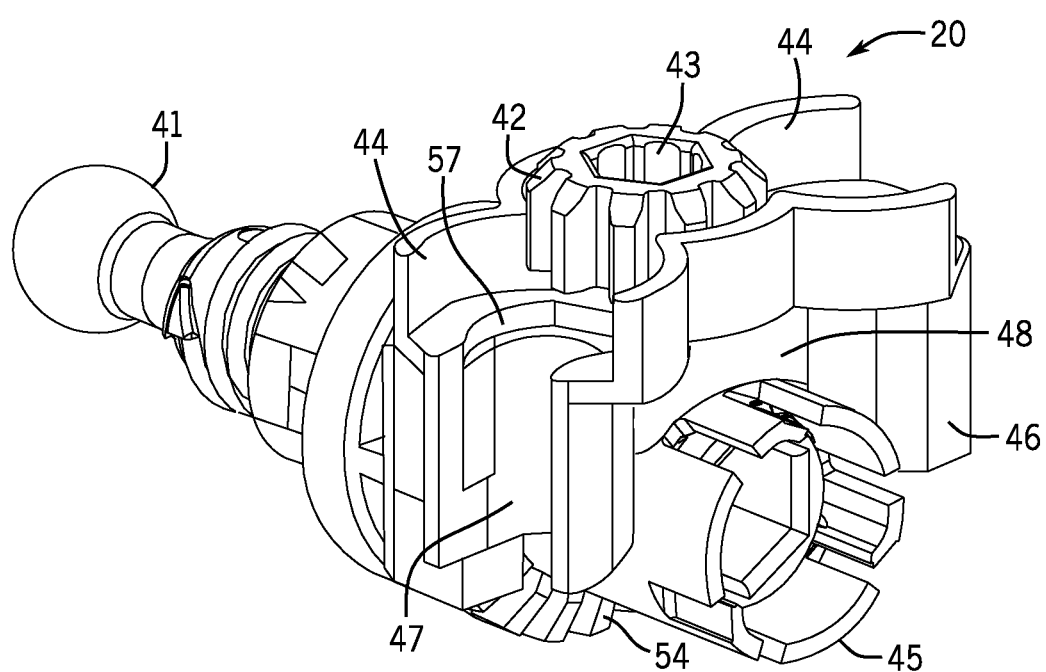
FIG. 2 is a perspective view of an adjuster assembly that could be used in one embodiment of a synchronized lamp adjuster assembly.

FIG. 2 shows an adjuster assembly 20 that is used in certain of the embodiments of the synchronized lamp adjuster assemblies 15 described here. Although a variety of designs for adjuster assemblies are already known in the art as noted above, the adjuster assembly shown in FIG. 2 is different. FIG. 2 shows an adjuster assembly 20 similar in function to that shown in U.S. Pat. No. 6,773,153, the disclosure of which is incorporated herein by reference. Adjuster assembly 20 shown here, however, has the additional features of an input shaft 43 that can be rotated by interaction with additional pieces.

Figure 3:
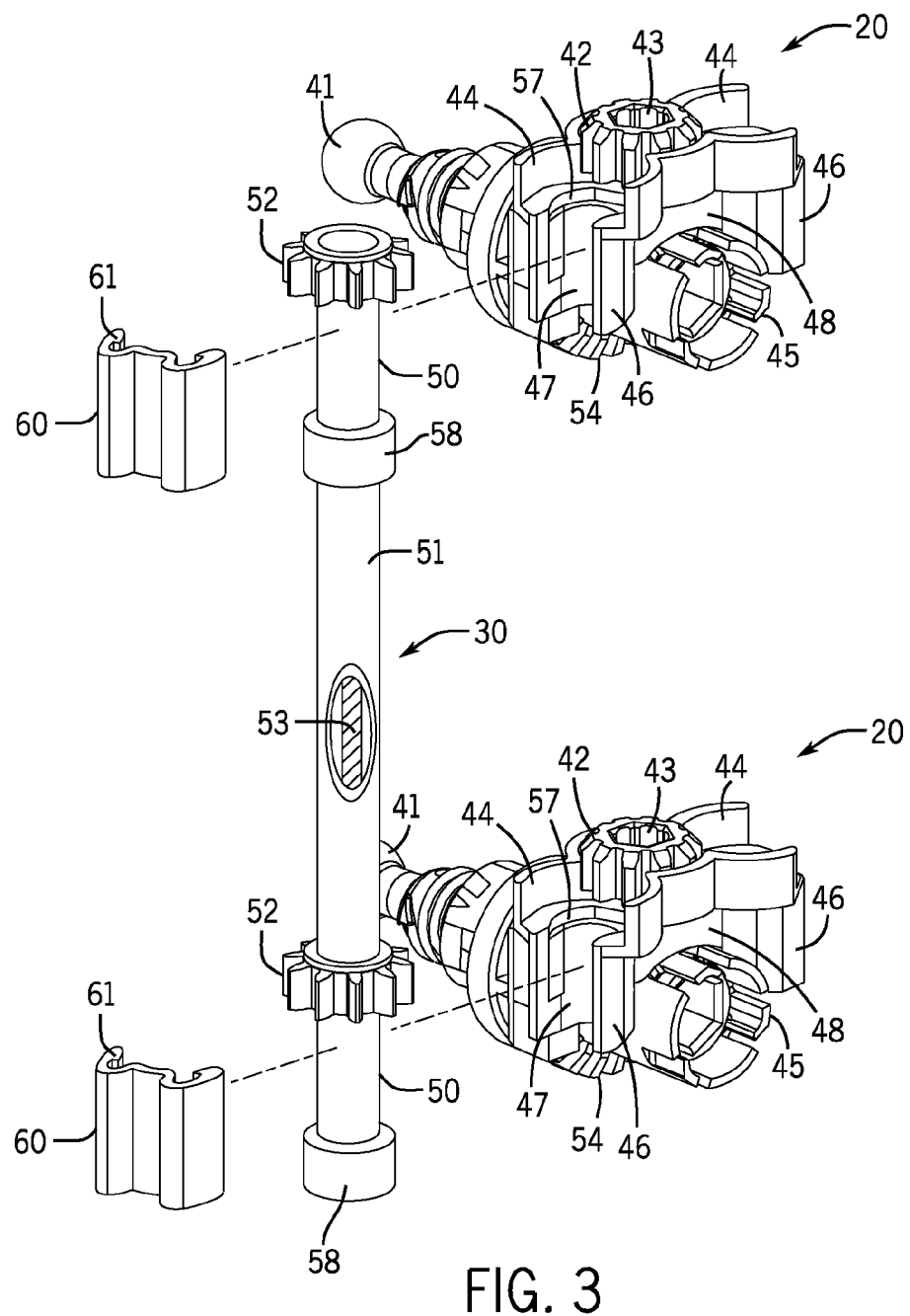
FIG. 3 is a partially exploded perspective view of certain components of one embodiment of a synchronized lamp adjuster assembly.
Figure 4:
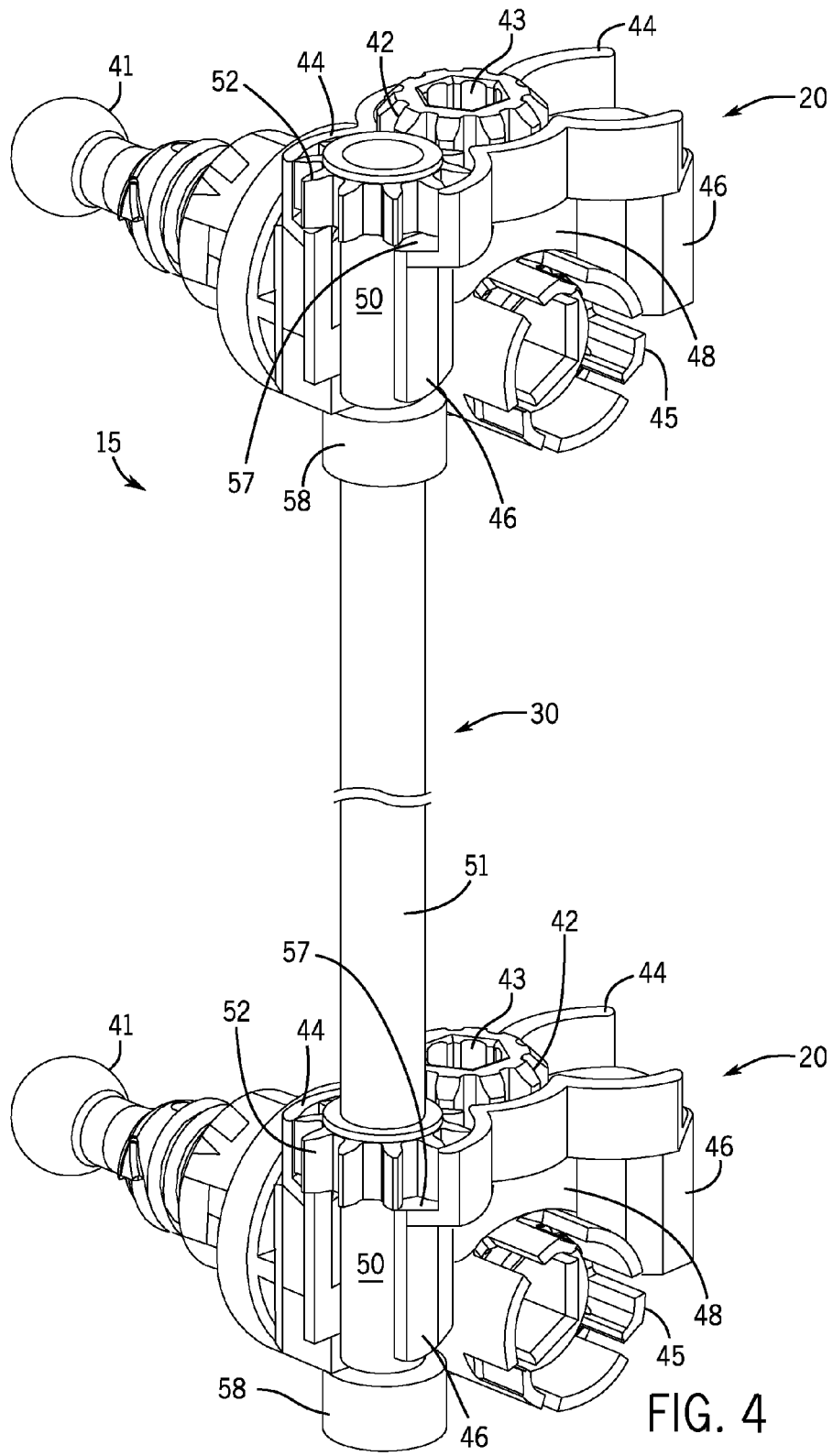
FIG. 4 is a perspective view of the components of the synchronized lamp adjuster assembly from FIG. 3 shown assembled.

Adjuster assembly 20 in FIG. 2 has an input shaft 43 operably connected to an adjustment ball stud 41 that moves fore or aft upon rotation of the input shaft 43. Input shaft 43 is capable of interacting with or receiving other parts that cause input shaft 43 to rotate. It will be apparent to one of skill in the art that input shaft 43 could have a variety of shapes and features for interacting with other parts. But as best shown in FIGS. 3 and 4, the upper end of input shaft 43 includes spur gear teeth 42, which can interact with shaft head teeth 52 to provide rotation of input shaft 43. The upper end of input shaft 43 also has an octagonal impression such that it could also interact with a wrench or driver. Towards the lower end of the part, input shaft 43 also includes a bevel gear (not shown in FIG. 2) for engaging output gear 45 on the adjustment ball stud 41. Adjustment ball stud 41 is a generally cylindrical body having a ball joint on one end and having or interacting with an output gear 45 on the other end of the part. The bevel gear teeth of input shaft 43 engage output gear teeth 54 to cause engagement of the bevel gear and to cause extension and retraction of the adjustment ball stud 41 within adjuster assembly 20.

Adjuster assembly 20 may include a housing 48 to support input shaft 43 and other components of the assembly. Housing 48 may also include features for receiving other parts of the synchronized lamp adjuster assembly. For example, housing 48 may include a receptacle 44 having a bore 47 and catch 46 for receiving shaft head 50 or other components of shaft drive assembly 30.

FIG. 3 shows the primary components of one embodiment of a synchronized lamp adjuster assembly 15, which includes at least two adjuster assemblies 20 and at least one shaft drive assembly 30. A synchronized lamp adjuster assembly 15 may include more adjuster assemblies 20, depending on the number of lamp assemblies that comprise the headlight of the vehicle. For example, a synchronized lamp adjuster assembly 15 for the headlight shown in FIG. 1c would likely have four adjuster assemblies 20. Returning to FIG. 3, the shaft drive assembly 30 has a shaft head 50 fixed at each end of a shaft head drive 53. Shaft head drive 53 may be made from a variety of materials, such as a flexible wire shaft or a rigid shaft. Shaft heads 50 may also include stays 58 and shaft head teeth 52 around the top of shaft head 50. Shaft head drive 53 is substantially enclosed in a protective sheath 51, which is received by shaft heads 50. Adjuster assemblies 20 are secured to shaft heads 50 using lock clips 60. In this embodiment, clip catch 61 of lock clip 60 snap fits to housing catch 46 to secure the shaft head 50 within bore 47 of receptacle 44 and thus securing shaft drive assembly to the housing 48 of the adjuster assembly 20. When the shaft head 50 is attached, the bore 47 receives and journals a shoulder 57 below the shaft head teeth 52 so that they may properly mesh with spur gear teeth 42 of input shaft 43.

Many different types of adjuster assemblies 20 could be used in a synchronized lamp adjuster assembly 15. And there are many ways in which adjuster assemblies 20 may be engaged to shaft drive assembly 30 which will be apparent to one of ordinary skill depending on the configuration of adjuster assemblies 20, the number of lamp assemblies and other factors. Several examples of such engagements are shown in the Figures.

FIG. 4 shows the synchronized lamp adjuster assembly of FIG. 3 assembled, having two adjuster assemblies 20 and one shaft drive assembly 30 (but without lock clips 60). Rotation of shaft drive assembly 30 causes synchronous rotation of both input shafts 43 through the interaction of shaft head teeth 52 with spur gear teeth 42. In turn, rotation of each input shaft 43 causes engagement of the bevel gear of adjuster assemblies 20 to cause the linear motion of adjustment ball stud 41. Actuation of adjustment ball studs 41 results in altering the angle of the headlamp reflector of lamp assemblies 21.

Figure 4A:
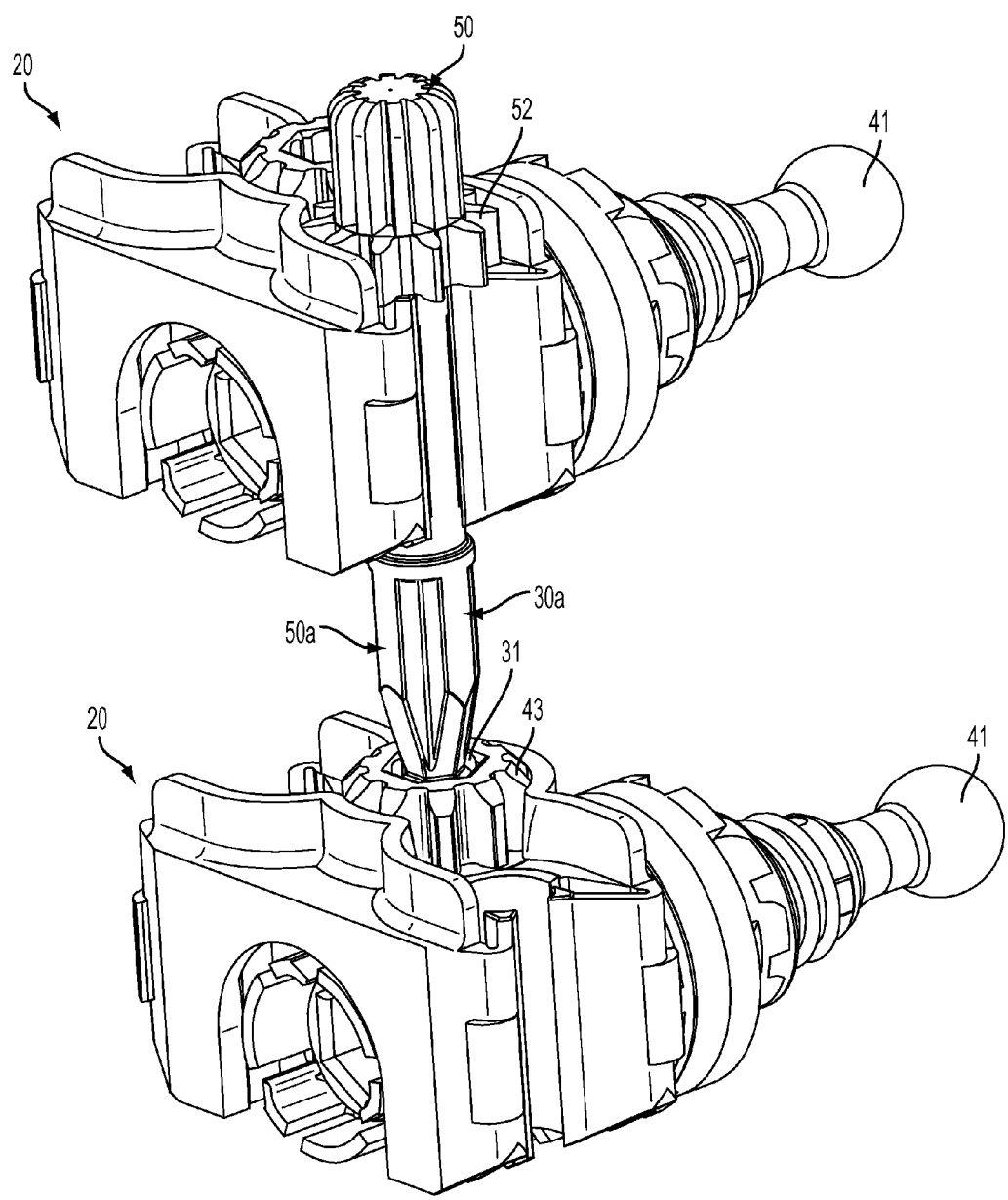
FIG. 4a shows an alternate embodiment of the synchronized lamp adjuster assembly of FIG. 4.

FIG. 4a shows an alternate embodiment of the synchronized lamp adjuster assembly of FIG. 4. In this embodiment, the one drive shaft assembly 30a is similar to the one drive shaft assembly 30, retaining the shaft head 50 with shaft head teeth 52, but now with its lower shaft head 50a having, in lieu of teeth 52, a male hexagonal portion 31 that mates with the hexagonal impression of the input shaft 43. Thus, rotation of the one drive shaft assembly 30a causes opposing rotation of each input shaft 43, which in turn causes opposite linear motion of each adjustment ball stud 41 provided each has the same handed thread. Actuation of the adjustment ball studs 41 results in altering the angle of the headlamp reflector of lamp assemblies 21.

Figure 5:
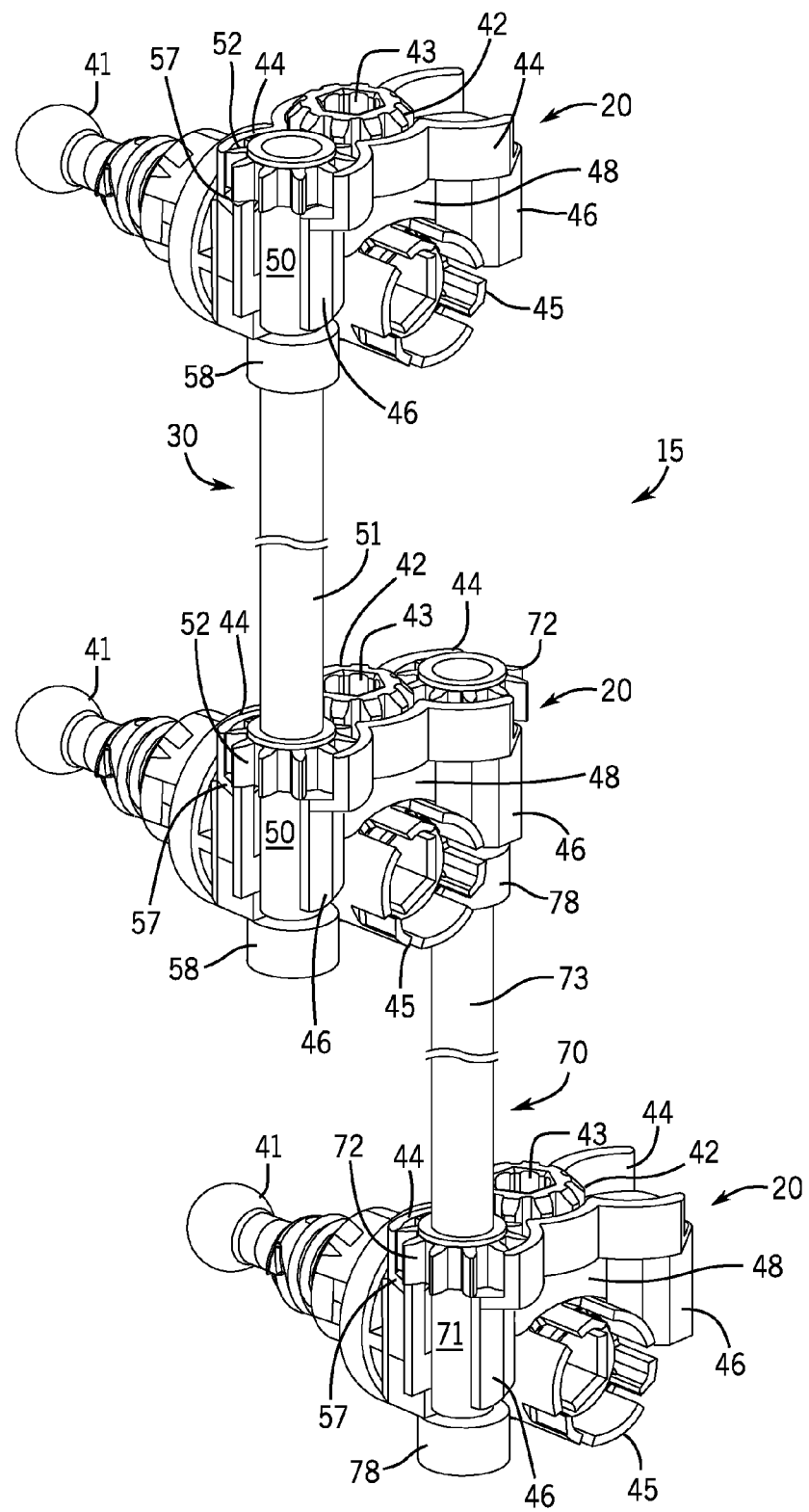
FIG. 5 is a perspective view of an alternative embodiment of a synchronized lamp adjuster assembly.

FIG. 5 shows another embodiment of a synchronized lamp adjuster assembly 15 having three adjuster assemblies 20, a shaft drive assembly 30 and a second shaft drive assembly 70. This illustrates an example synchronized lamp adjuster assembly 15 with more than two adjuster assemblies 20 and multiple shaft drive assemblies 30 and 70; additional adjuster assemblies and shaft drive assemblies could be added in similar serial fashion. In FIG. 5, second shaft drive assembly 70 has the same components as shaft drive assembly 30, namely a shaft head drive inside a sheath 73, shaft heads 71, shaft head teeth 72, and stays 78. Rotation of one shaft drive assembly 30 causes synchronous rotation of the input shafts 43 of the adjuster assemblies 20 engaged with it, which in turn causes synchronous rotation of second shaft drive assembly 70 and any additional adjuster assemblies 20 engaged with it. This effectively causes synchronous rotation of all three input shafts 43 and associated bevel gears, and provides a single adjustment point for as many as three lamp assemblies (not shown) associated with adjustment ball studs 41.

FIG. 5 also illustrates how one shaft drive assembly 30 via one of its shaft heads can be operably connected to another shaft drive assembly 70 via its shaft head by an intermediate adjuster assembly 20, such as the middle adjuster assembly 20 shown in FIG. 5. In some applications, it may not be necessary for the middle adjuster assembly 20 to include an adjustment ball stud 41. For example, as shown in FIG. 14, it may be desirable to synchronize the adjustment of two spaced apart adjustment assemblies 20 from one remote location. This can be done with an intermediate adjuster assembly, the intermediate adjuster assembly including or not including an adjustment ball stud 41, as further explained below.

Figure 6:
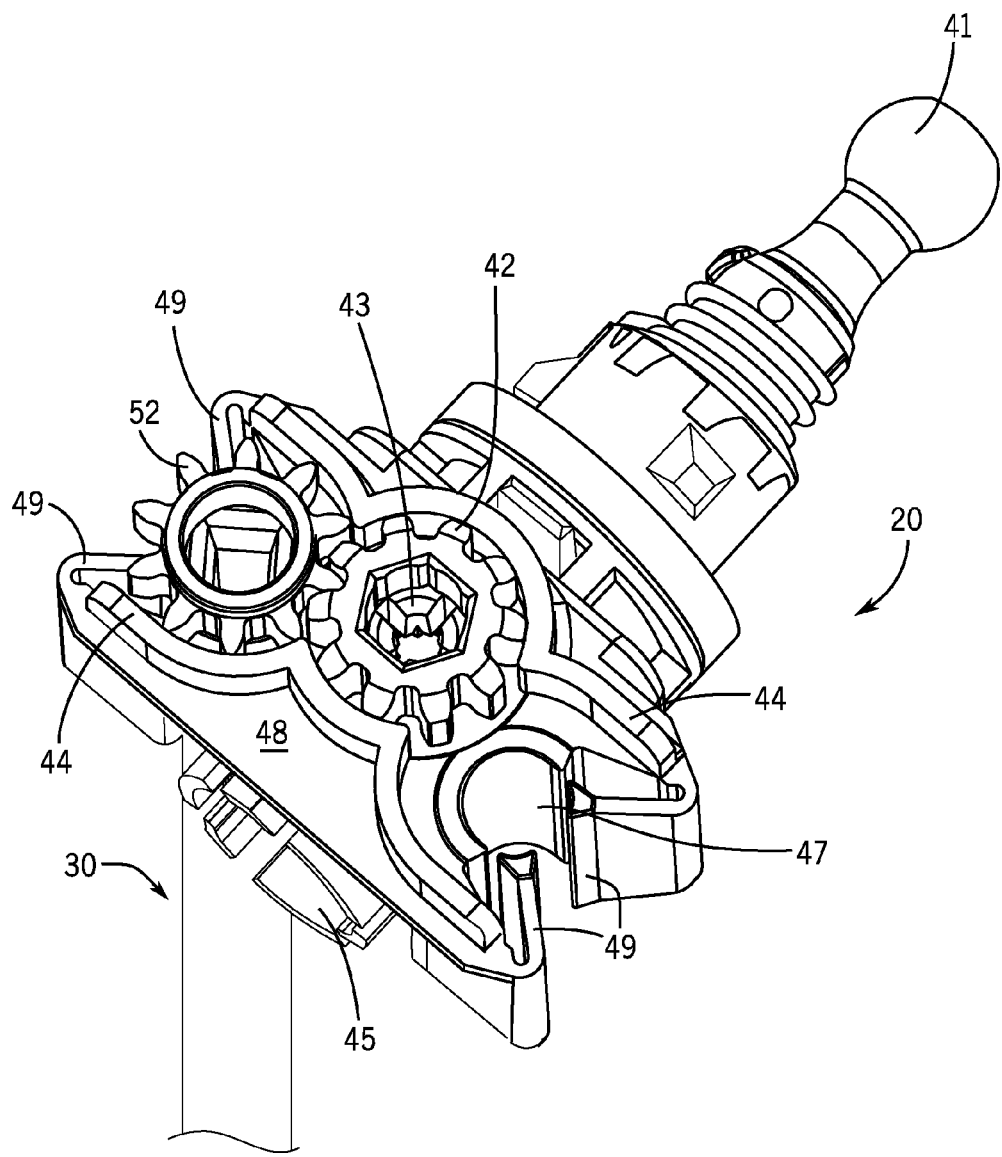
FIG. 6 is a top perspective view of the top adjuster assembly in the synchronized lamp adjuster assembly shown in FIG. 5.

FIG. 6 shows an alternative way to attach an adjuster assembly 20 to a shaft drive assembly 30, without the lock clip 60 and clip latch 61. Instead, as shown in FIG. 6, flexible snap fingers 49 are incorporated into the receptacle 44 of housing 48 and receives shaft drive assembly 30. Other alternative means to attach adjuster assemblies 20 to shaft drive assemblies would be readily apparent to those of ordinary skill as well.

Figure 7:
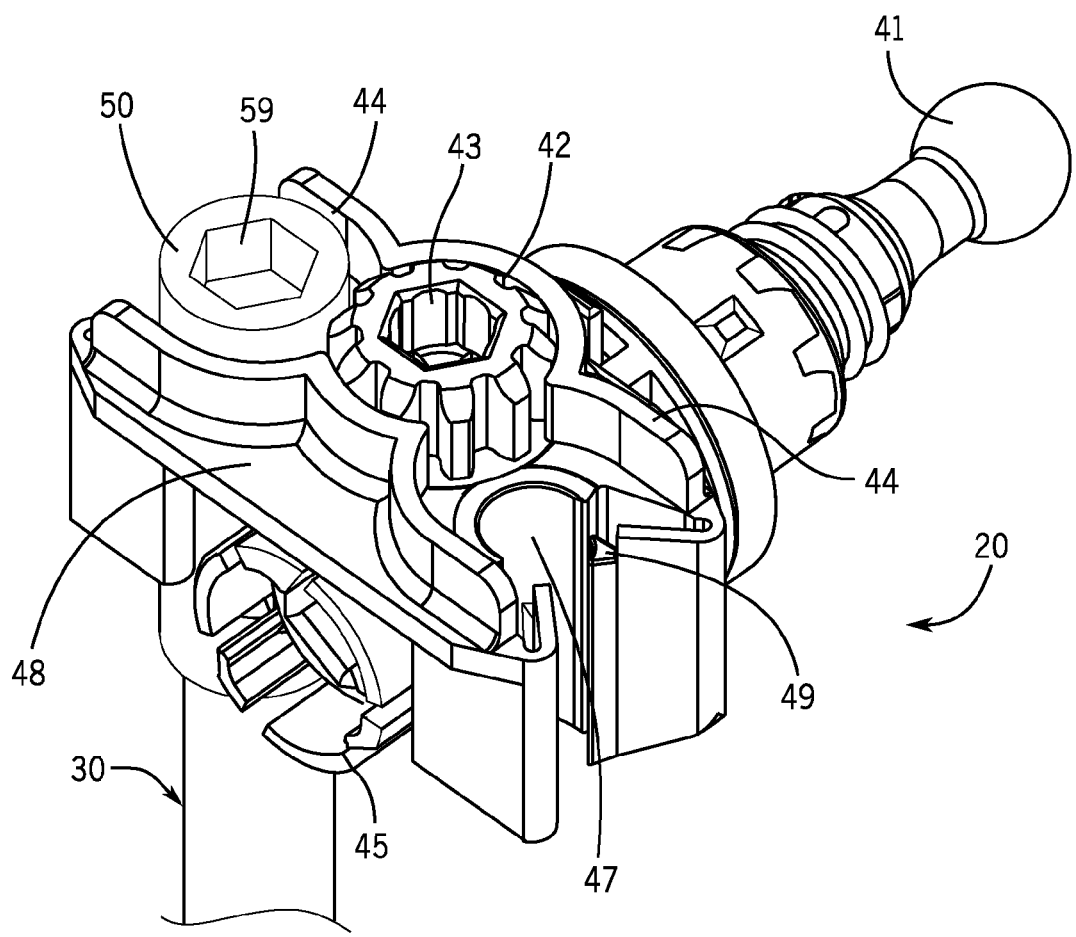
FIG. 7 is top perspective view of an alternative embodiment of a synchronized lamp adjuster assembly wherein the shaft head does not have shaft head teeth, which may be used for example for adjusting more than one lamp assembly from the same adjuster assembly.

FIG. 7 shows another variation possible for the synchronized lamp adjuster assembly, where shaft head 50 does not have shaft head teeth 52. Shaft head 50 may include a drive depression 59 that could be rotated with a driver, such as a hex drive, flathead, Phillips head or the like. It may be desirable to omit shaft head teeth 52 where aim adjustment is desired independently without synchronization such as for vertical and horizontal aiming. The design shown in FIG. 7 would provide for adjustment of two or more adjustment assemblies in a single location in the vehicle. As well, in many configurations of adjuster assemblies 20, there would be room for more than one receptacle 44 in the housing 48. One receptacle 44 could thus be used for a shaft head 50 without shaft head teeth 52 that would not interact with input shaft 43. Additionally or alternatively, the other receptacle could be used with a shaft head having shaft head teeth 52. The use of multiple receptacles 44 in the adjuster assembly 20 provides for multiple configurations of synchronized lamp adjuster assemblies having synchronous and independent adjustment mechanisms.

Figure 8:
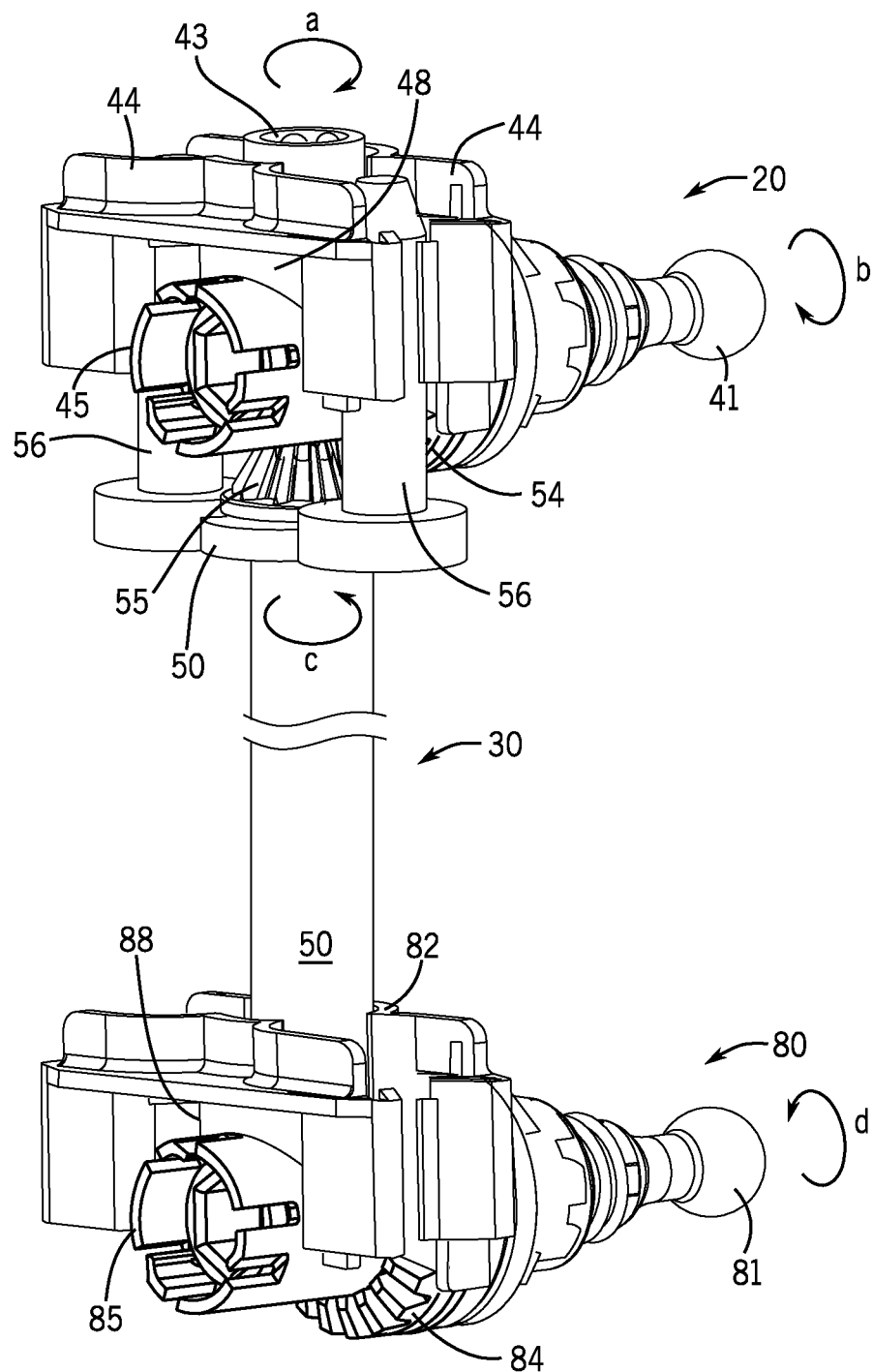
FIG. 8 is a rear perspective view of an alternative embodiment of a synchronized lamp adjuster.

FIG. 8 shows another alternative embodiment of a synchronized lamp adjuster assembly 15 where shaft drive assembly 30 also includes another bevel gear 55 integral with shaft head 50. Shaft drive assembly 30 is attached to adjuster assembly 20 by engagement of posts 56 with the two receptacles 44 of adjuster assembly 20. These could be attached in a snap-fit manner or using a lock clip 60 (not shown) or by other means. Shaft drive assembly 30 is engaged with adjuster assembly 80 on the other end of the assembly. Shaft head 50 is integral with the shaft drive assembly 30 to form an input shaft, which is inserted into shaft drive receptacle 82 and is also partially enclosed by second housing 88 to engage and attach shaft drive assembly 30 to second adjuster assembly 80. This arrangement will rotate the two output gears 45 and 85 in opposite directions. The direction of rotation of the various gears in this arrangement is illustrated by arrows in FIG. 8. Rotation of input shaft 43 in the direction shown by arrow a causes rotation of the upper adjustment ball stud 41, output gear 45 and output gear teeth 54 in the direction shown by arrow b. This in turn causes rotation of bevel gear 55 in the direction shown by arrow c and the second adjustment ball stud is thus rotated in the direction shown by arrow d. To synchronize the adjustment motion so that both ball studs 41 and 81 move in the same fore and aft motion, adjuster assemblies 20 and 80 would have gears threaded in opposite directions; for example, adjuster assembly 20 would have a right hand threaded gear and adjuster assembly 80 would have a left hand threaded gear.

Figure 9:
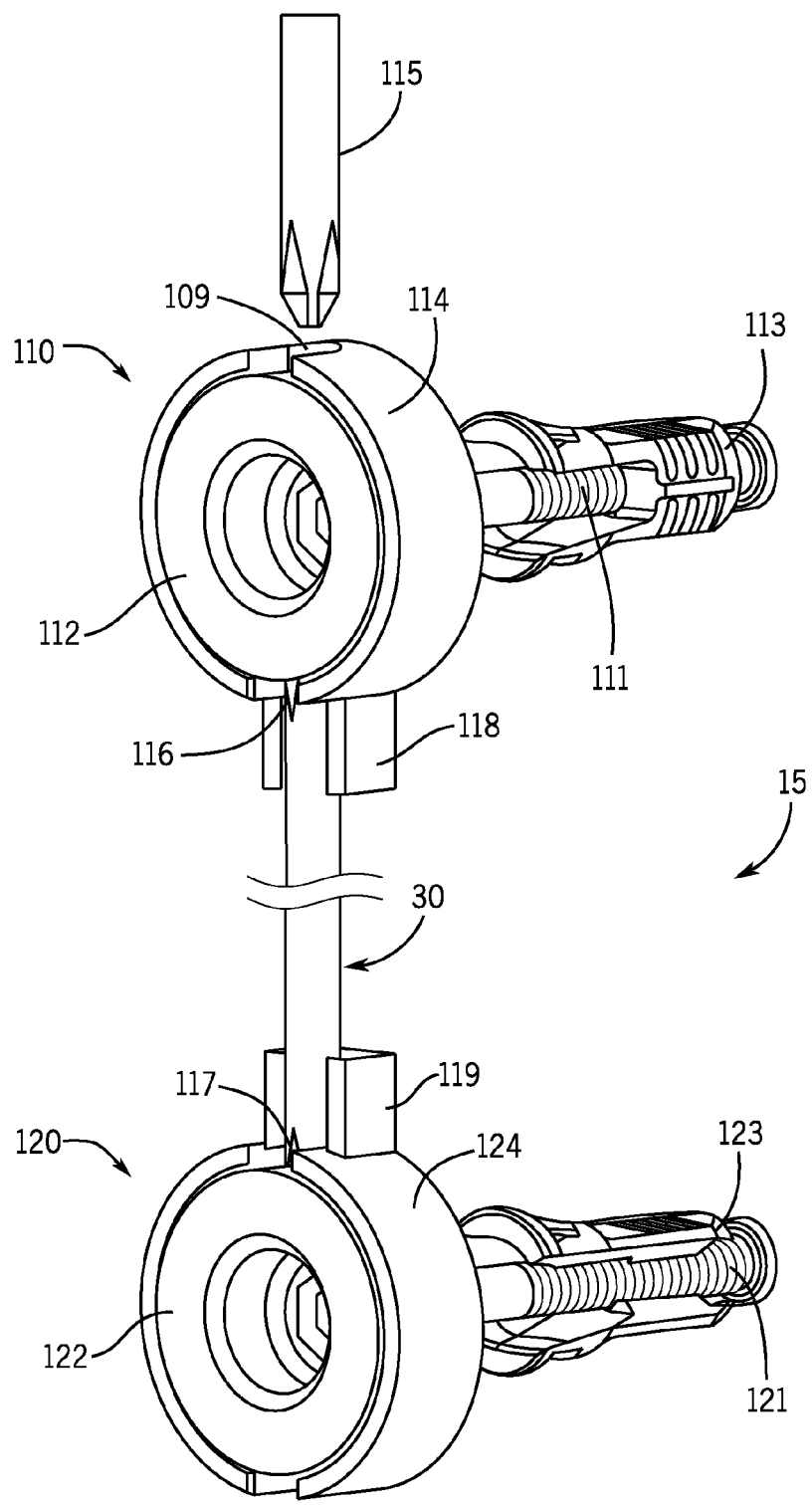
FIG. 9 is a rear perspective view of a gear screw type adjuster embodiment of a synchronized lamp adjuster assembly.

FIG. 9 shows an embodiment of a synchronized lamp adjuster assembly 15 that uses a gear screw type adjuster similar to those disclosed in U.S. Pat. No. 7,052,164 and U.S. Publication No. 2011/0032716 (application Ser. No. 12/744,907), the disclosures of which are incorporated here by reference. In these prior art references, a gear screw and grommet provide the desired linear motion instead of an adjustment ball stud 41. The synchronized lamp adjuster assembly 15 shown in FIG. 9 has gear screw adjuster assembly 110 and second gear screw adjuster assembly 120, which are operably connected by shaft drive assembly 30. Here, shaft drive assembly 30 is a solid shaft rather than a drive enclosed in a sheath, but a variety of configurations of a shaft drive assembly 30 could be used here.

Gear screw adjuster assembly 110 includes a gear screw 111 having gear screw head 112. Gear screw 111 is at least partially surrounded by grommet 113, which interacts with the reflector of a lamp assembly used in a headlight. Gear screw head 112 is partially enclosed by housing 114 having a recess 109. Similarly, second gear screw adjuster assembly 120 includes a second gear screw 121 having second gear screw head 122. Second gear screw 121 is at least partially surrounded by second grommet 123, which interacts with the reflector of a second lamp assembly in the headlight. Second gear screw head 122 is partially enclosed by second housing 124. The underside of gear screw head 112 and second gear screw head 122 each have gear teeth (not visible here). The ends of shaft drive assembly 30 are shaped as driver heads 116 and 117 that match the gear teeth on the gear screw heads 112 and 122. Shaft driver head 116 is received by driver receptacle 118 of housing 114 of gear screw adjuster assembly 110. And second shaft driver head 117 is received by second driver receptacle 119 of second gear screw adjuster assembly 120.

To adjust the synchronized lamp adjuster assembly 15 in FIG. 9, a driver 115 is inserted into recess 109. The driver 115 may have a flathead, Phillips head, Torx head, hexagonal head, or the like, depending on the configuration used for the gear teeth behind gear screw head 112. Actuation of driver 115 while driver 115 is engaged with gear teeth on gear screw head 112 results in rotation of gear screw 111 and movement of the grommet 113 and ultimately the reflector of the lamp assembly into the desired position. This also results in rotation of shaft drive assembly 30 because shaft driver head 116 also engages with gear teeth on gear screw head 112. Second shaft driver head 117 engages with gear teeth on the second gear screw head 122 to synchronously rotate second gear screw 121 and to move second grommet 123 to adjust the reflector of a second lamp assembly. To synchronize the adjustment motion of adjuster assemblies 110 and 120, such that both move forward or backward together, adjuster assemblies with opposite threading would be used. For example, adjuster assembly 110 would have a right hand thread and adjuster assembly 120 would have a left hand thread.

FIGS. 10a and 10b illustrate the assembly of a synchronized lamp adjuster assembly 15 having two adjuster assemblies 20. The two adjuster assemblies 20 are positioned in place around the shaft drive assembly 30, which is fitted into each of the adjuster assemblies 20. Lock clips 60 are then snapped into place to secure the shaft drive assembly 30 in the two adjuster assemblies 20. FIG. 10a shows several component parts of the synchronized lamp adjuster assembly 15 before assembly; FIG. 10b shows the assembled synchronized lamp adjuster assembly 15.

Figure 11A:
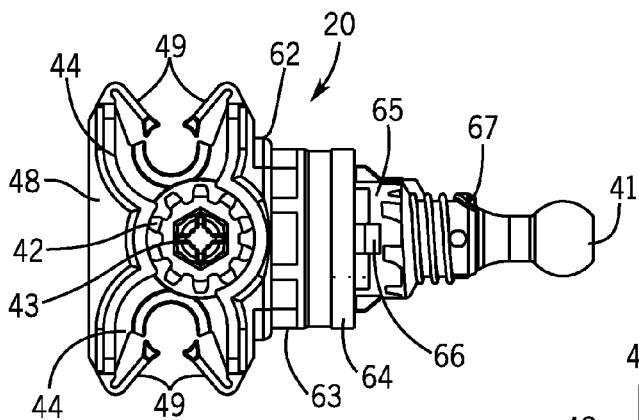
FIGS. 11a-d illustrate an alternative embodiment of an adjuster assembly for use in a synchronized lamp adjuster assembly.
Figure 11B:
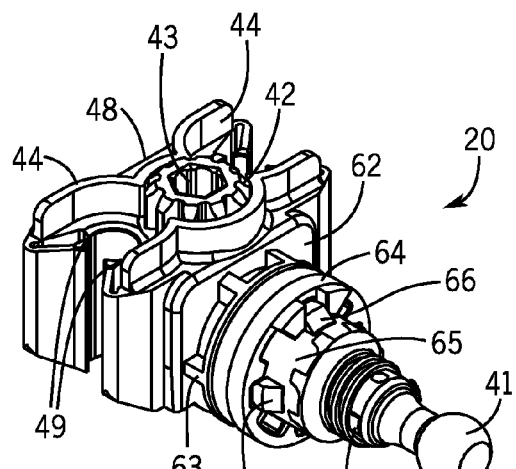
Figure 11C:
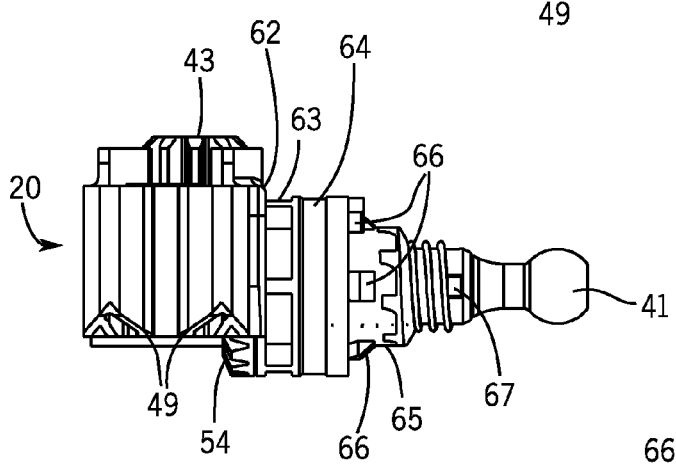
Figure 11D:
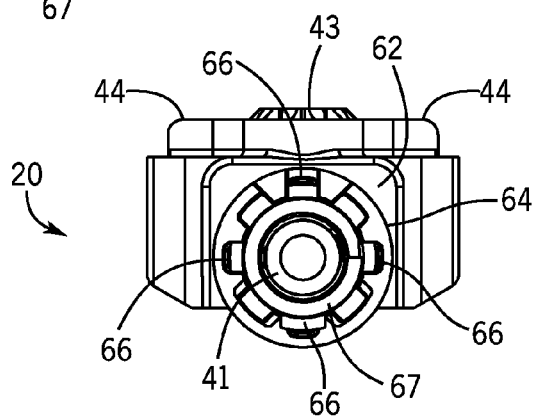

FIGS. 11a-d illustrate in further detail the embodiment of adjuster assembly 20 shown in FIGS. 6 and 7. FIG. 11a is a top view of adjuster assembly 20 having two receptacles 44 each with two snap fingers 49 for retaining shaft drive assembly 30. FIG. 11b is a front perspective view; FIG. 11c is a side view of the adjuster assembly 20; and FIG. 11d is a front elevation view of adjuster assembly 20. Housing 48 supports input shaft 43, adjustment ball stud 41 and output gear 45 to assist with proper engagement of the various components of the adjuster assembly 20. From the exterior top view in FIG. 11a, the two receptacles 44 can be seen, along with input shaft 43 having spur gear teeth 42. From the front surface 62 of housing 48, projects a barrel 65. The barrel 65 has lugs 66 or other markings or protrusions projecting from its exterior surface to assist with orientation of the adjuster during installation and mounting. Four lugs 66 are shown but other numbers could be used, and other means could be utilized for mounting as well. A flange 63 surrounds the outer circumference of the barrel 65 and serves as a seat for gasket 64. The gasket 64 seals the adjuster to the back of the structure to which it is mounted in the vehicle. Adjustment ball stud 41 is a generally elongate or cylindrical member that is partially threaded. The front end as shown is round or ball shaped, but could be of various shapes depending on the type of socket into which it is placed to be secured to a reflector in a lamp assembly. Adjustment ball stud 41 could be solid or hollow and could be made from a variety of materials such as plastic, metal, or composite. Adjustment ball stud 41 protrudes through barrel 65. Adjustment ball stud may be partially or entirely threaded (and may correlate to the desired maximum and minimum extension of the ball stud) and may include stops 67 or other features to prevent it from being over adjusted.

Figures 12A, 12B:
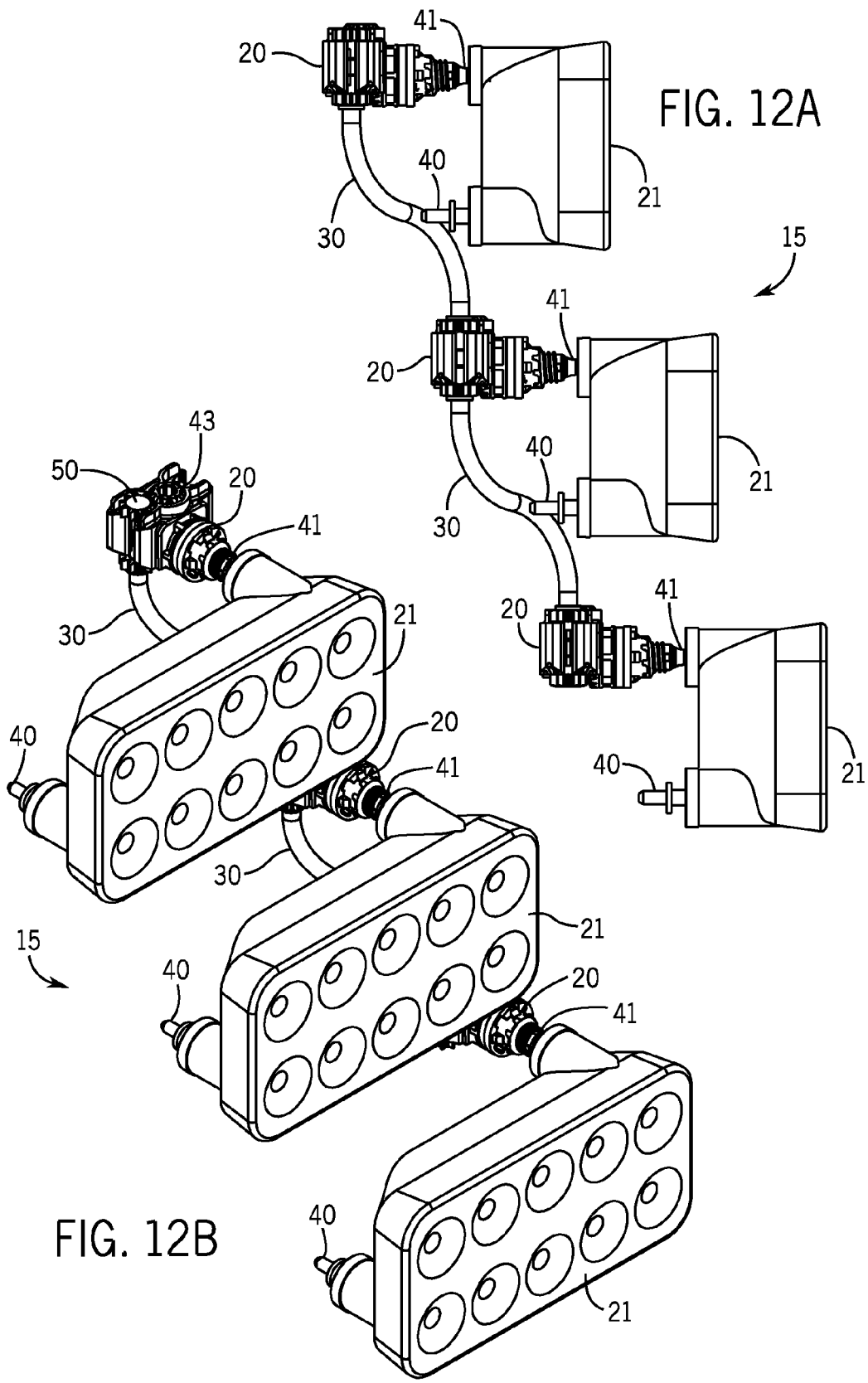
FIGS. 12a and b illustrate an embodiment of a synchronized lamp adjuster assembly used with lamp assemblies having multiple LEDs.
FIG. 12b is a front perspective view of this embodiment of a synchronized lamp adjuster assembly.

FIGS. 12a and 12b show an example of a synchronized lamp adjuster assembly 15 in use with a series of multiple-LED lamp assemblies 21. The synchronized lamp adjuster assembly 15 includes three lamp assemblies 21 each mounted to one stationary ball stud assembly 40 and to adjuster assembly 20 with a moveable adjustment ball stud 41. Each adjuster assembly 20 is operably connected by shaft drive assemblies 30. When input shaft 43 is rotated by interaction with rotating shaft head 50, adjustment ball stud 41 is extended or retracted and the lamp assemblies 21 are rotated or pivoted with respect to stationary ball stud 40.

Figure 1B:
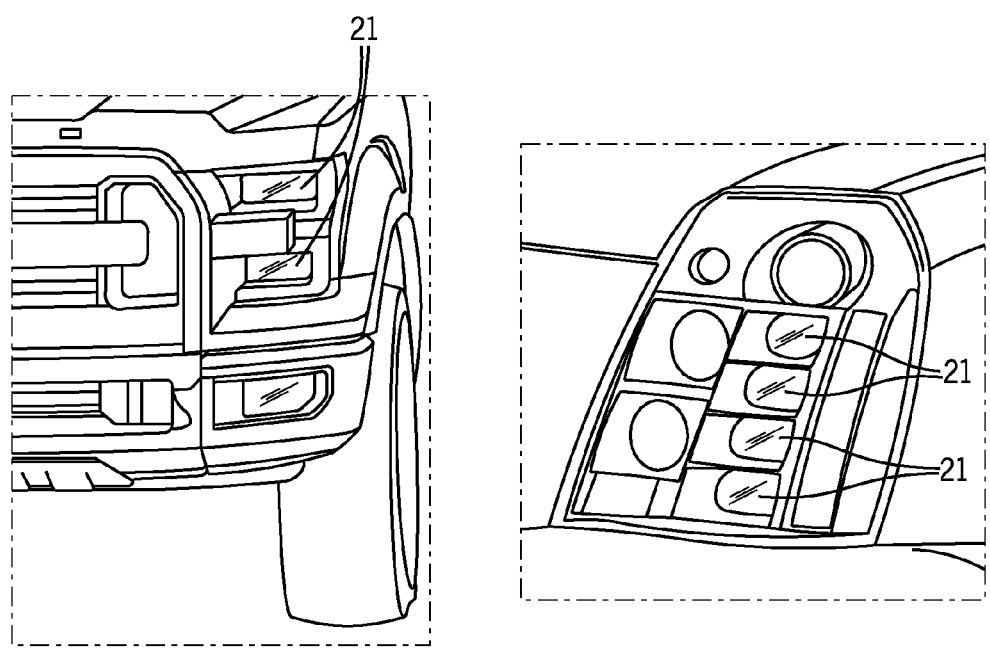
Figure 1C:
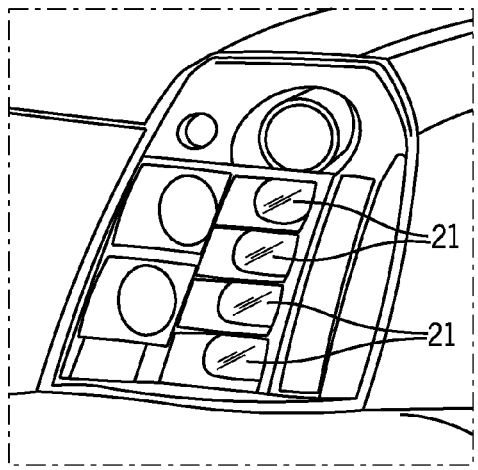

FIG. 13 shows two of the adjuster assemblies 20 from FIGS. 6, 7, and 11 connected together in a synchronized lamp adjuster assembly 15, that would be useful, for example, in a headlight such as that shown in FIG. 1b.

In an alternate embodiment, the adjuster assembly 20, as shown in FIG. 5, middle assembly, can omit the ball stud 41, as shown in FIGS. 14 and 15. In all other respects, the operation of the synchronized lamp adjuster assembly 15 remains the same. Thus, in this embodiment, the adjuster assembly is not really an adjuster at all, but a synch adjuster head 20' into which two shaft drive assemblies are snap-fit, via an engagement arrangement, such as the receptacles 44 and catches 46 formed in the housing 48', to ensure synchronized movement of two attached adjusters 20. In at least some embodiments, the receptacles 44 include a bore 47 and catch 46 for receiving shaft heads 50 or other components of the shaft drive assemblies. Further, in at least some embodiments, the receptacles 44 are positioned opposite each other relative to the input shaft 43, as shown in FIGS. 14 and 15. As discussed above, in at least some embodiments, the shaft heads 50 are interconnected by respective shaft head drives 53, which in at least some embodiments include a flexible wire shaft enclosed in the protective sheath 51. As shown in FIG. 14, the protective sheath 51 can include a bent portion 89 to assist with a desired adjuster alignment. One installs the two adjusters in the headlamp and gets them into adjustment, and then the shaft drive assemblies are snapped into the synch adjuster head 20' so that any further adjustments will adjust both headlamps at the same time. As shown, the input shaft 43 includes the spur gear teeth 42 extending therefrom, which engage the shaft head teeth 52 to provide synchronous rotation of the shaft drive assemblies 30 and 70. As shown in FIG. 15, the sync adjuster head housing 48' can include means for aiding in the mounting of the sync adjuster head 20' in a vehicle, such as by including a quarter turn mount 41' where the adjustment ball stud 41 is found in the other embodiments. Of course, alternative mounting methods such as screws, fastening clips or adhesive could be used.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A synchronized lamp adjuster assembly for a vehicle headlight comprising:
   a synchronized adjuster head having a main input shaft rotatably secured to a housing with a main spur gear secured to the main input shaft;
   a first adjuster having a first adjuster input shaft operably connected to a first adjustment stud that moves fore or aft upon rotation of the first adjuster input shaft;
   a second adjuster having a second adjuster input shaft operably connected to a second adjustment stud that moves fore or aft upon rotation of the second adjuster input shaft, wherein the first adjustment stud and second adjustment stud are engageable with a lamp assembly in the vehicle headlight so as to selectively change a position of the lamp assembly;
   a first shaft drive assembly having two first shaft heads, wherein one of the first shaft heads is rotatably connected to the first adjuster input shaft and the other of the first shaft heads is rotatably secured to the housing and includes first shaft drive teeth that rotatably engage the main spur gear of the synchronized adjuster head; and
   a second shaft drive assembly having two second shaft heads, wherein one of the second shaft heads is rotatably connected to the second adjuster input shaft and the other of the second shaft heads is rotatably secured to the housing and includes second shaft drive teeth that rotatably engage the main spur gear of the synchronized adjuster head, such that when the main input shaft is rotated, the first and second adjuster input shafts move simultaneously to change the position of the lamp assembly with which each adjuster interacts.

2. The synchronized lamp adjuster assembly of claim 1, wherein the first shaft heads are interconnected by a first shaft head drive comprised of a first flexible wire shaft.

3. The synchronized lamp adjuster assembly of claim 2, wherein the second shaft heads are interconnected by a second shaft head drive comprised of a second flexible wire shaft.

4. The synchronized lamp adjuster assembly of claim 3, wherein at least one of the first and second flexible wires shafts is enclosed in a protective sheath.

5. The synchronized lamp adjuster assembly of claim 4, wherein the protective sheath includes a bent portion.

6. The synchronized lamp adjuster assembly of claim 1, wherein the housing includes a first receptacle and a second receptacle, and wherein the other of the first shaft heads is received and rotatably secured in the first receptacle, the other of the second shaft heads is received and rotatably secured in the second receptacle.

7. The synchronized lamp adjuster assembly of claim 6, wherein the other of the first shaft heads and the other of the second shaft heads extend substantially parallel to and adjacent to each other.

8. The synchronized lamp adjuster assembly of claim 6, wherein the first and second receptacles each include a catch to provide a snap-fit engagement of the other of the first shaft heads and the other of the second shaft heads to the synchronized adjuster head.

9. The synchronized lamp adjuster assembly of claim 1, wherein the first shaft drive assembly and the second shaft drive assembly extend substantially parallel and adjacent to each other along a substantially vertical axis.

10. The synchronized lamp adjuster assembly of claim 9, wherein the first adjuster is situated in a position vertically higher than the second adjuster.

11. The synchronized lamp adjuster assembly of claim 1, wherein the first shaft drive assembly and the second shaft drive assembly both extend in the same direction from the housing.

12. The synchronized lamp adjuster assembly of claim 1, wherein the first shaft drive teeth rotatably engage the spur gear in a position that is opposite the engagement of the second shaft drive teeth.

* * * * *